(12) United States Patent
Du et al.

(10) Patent No.: US 8,459,599 B2
(45) Date of Patent: Jun. 11, 2013

(54) SUPPORT STAND FOR SUPPORTING ELECTRONIC DEVICE

(75) Inventors: Bin Du, Shenzhen (CN); Wen-Rong Chen, New Taipei (TW); Hui Li, Shenzhen (CN); Cong Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 142 days.

(21) Appl. No.: 13/169,776

(22) Filed: Jun. 27, 2011

(65) Prior Publication Data
US 2012/0160973 A1   Jun. 28, 2012

(30) Foreign Application Priority Data

Dec. 25, 2010   (CN) .......................... 2010 1 0606819

(51) Int. Cl.
*F16M 11/02*    (2006.01)

(52) U.S. Cl.
USPC ............... 248/181.1; 248/176.3; 248/181.2; 248/206.5; 248/917; 248/919; 248/922

(58) Field of Classification Search
USPC ............... 248/181.1, 181.2, 176.3, 917, 919, 248/922, 206.5, 160
See application file for complete search history.

(56) References Cited

U.S. PATENT DOCUMENTS

| 6,679,612 B1 * | 1/2004 | West et al. ............... 359/871 |
| 7,341,356 B1 * | 3/2008 | Zadro ..................... 359/840 |
| 7,984,886 B2 * | 7/2011 | Lin ........................ 248/181.1 |
| 2004/0233623 A1 | 11/2004 | Hillman et al. |

FOREIGN PATENT DOCUMENTS

CN           201017270 Y      2/2008

* cited by examiner

*Primary Examiner* — Amy J Sterling
(74) *Attorney, Agent, or Firm* — Altis Law Group, Inc.

(57) ABSTRACT

A support stand includes a base; two support rods rotatably mounted to the base; a positioning rod retained on the base, the positioning rod can remain in a bent state after being bent by itself; and a support board removably positioned above the base by the corporation of the support rods and the positioning rod.

15 Claims, 5 Drawing Sheets

SUPPORT STAND FOR SUPPORTING ELECTRONIC DEVICE

BACKGROUND

1. Technical Field

The exemplary disclosure relates to support stands for supporting electronic devices.

2. Description of Related Art

Some support stands are used to support electronic products so the electronic product can sit on a desk or other supporting surface to make it more comfortable for the users to view the displays. However, typical support stands have a complicated structure and can not steadily support the electronic product.

Therefore, there is room for improvement within the art.

BRIEF DESCRIPTION OF THE DRAWINGS

Many aspects of the exemplary support stand and electronic device using the support stand can be better understood with reference to the following drawings. These drawings are not necessarily drawn to scale, the emphasis instead being placed upon clearly illustrating the principles of the present support stand. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
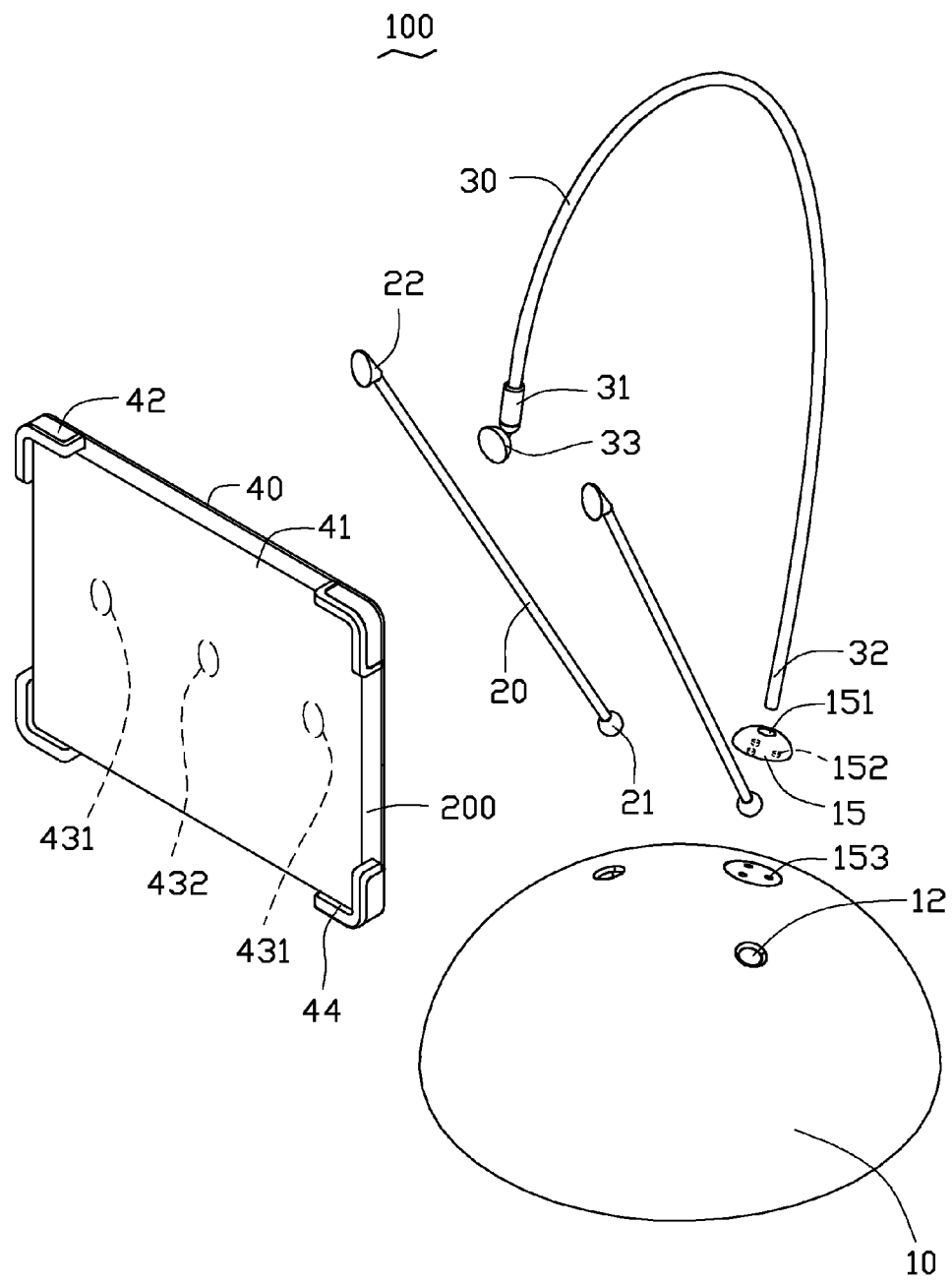
FIG. 1 is an exploded view of a support stand according to an exemplary embodiment.
Figure 2:
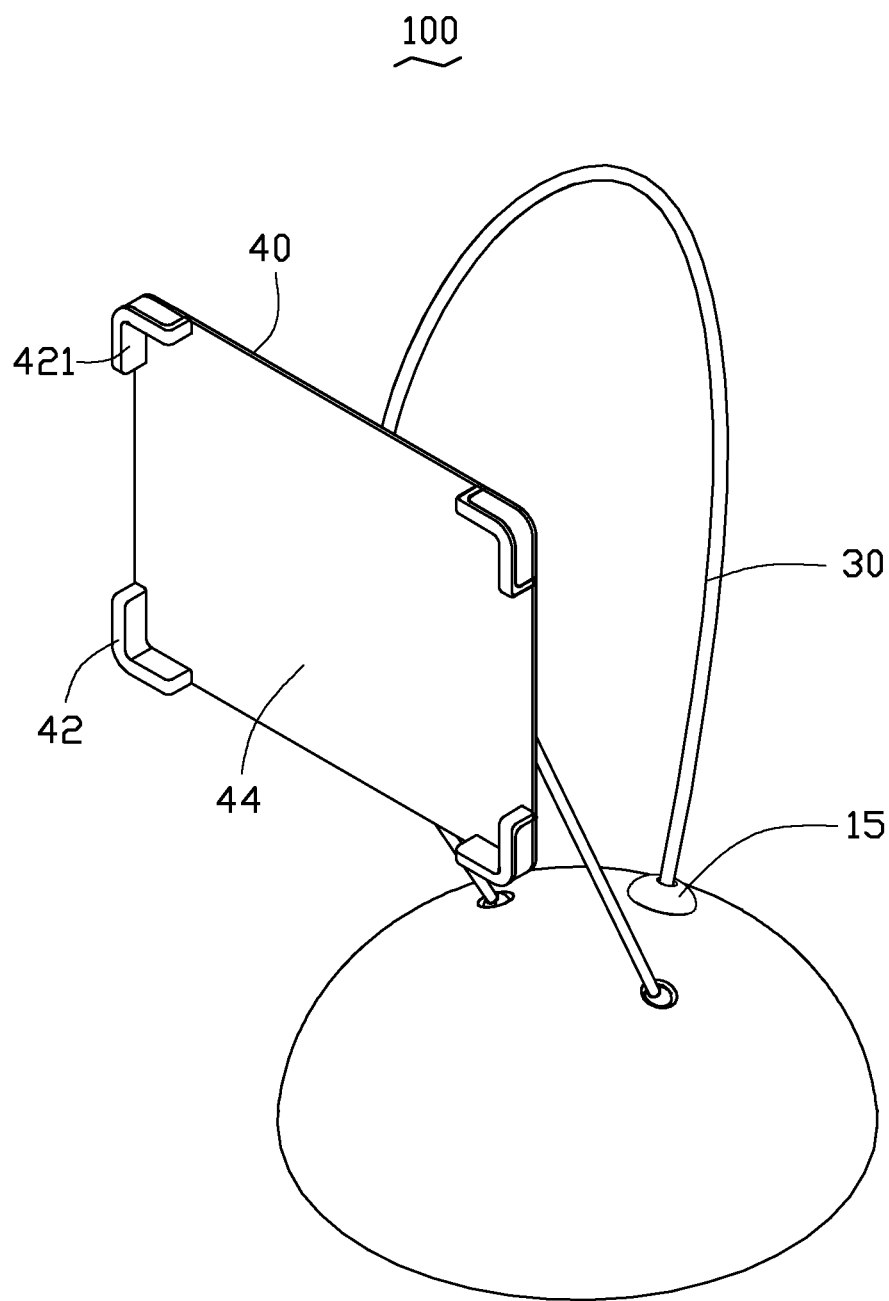
FIG. 2 is an assembled and partially enlarged view of the support stand.

An embodiment of a support stand 100 is shown in FIGS. 1 and 2. The support stand 100 includes a base 10, two support rods 20, a positioning rod 30, and a support board 40. The support rods 20 are rotatably mounted to the base 10. The support board 40 can be removably positioned above the base 10 by the cooperation of the support rods 20 and the positioning rod 30.

The base 10 defines two spherical holes 12, and each spherical hole 12 rotatably retains one of the support rods 20. The base 10 further includes a mounting board 15. The mounting board 15 defines a retaining hole 151 in one side thereof for retaining the positioning rod 30 on the base 10. The mounting board 15 further includes a plurality of retaining pins 152 protruding from another side thereof opposite to the retaining hole 151. The base 10 defines an equal number of retaining troughs 153 corresponding to the retaining pins 152. Each retaining pin 152 is retained in one of the retaining troughs 153 to hold the mounting board 15 to the base 10. Positions of the spherical holes 12 and the mounting piece 15 form corners of a triangle for better supporting the support board 40.

The support rods 20 are made of rigid material. Each support rod 20 includes a ball joint 21 located at one end thereof and a first magnet 22 located at another end thereof. The ball joints 21 have the same shape and size as the spherical holes 12. Each ball joint 21 is located (e.g. by snap-fit) in one of the spherical holes 12 to rotatably retain (e.g. by snap-fit) a corresponding support rod 20 on the base 10.

Figure 3:
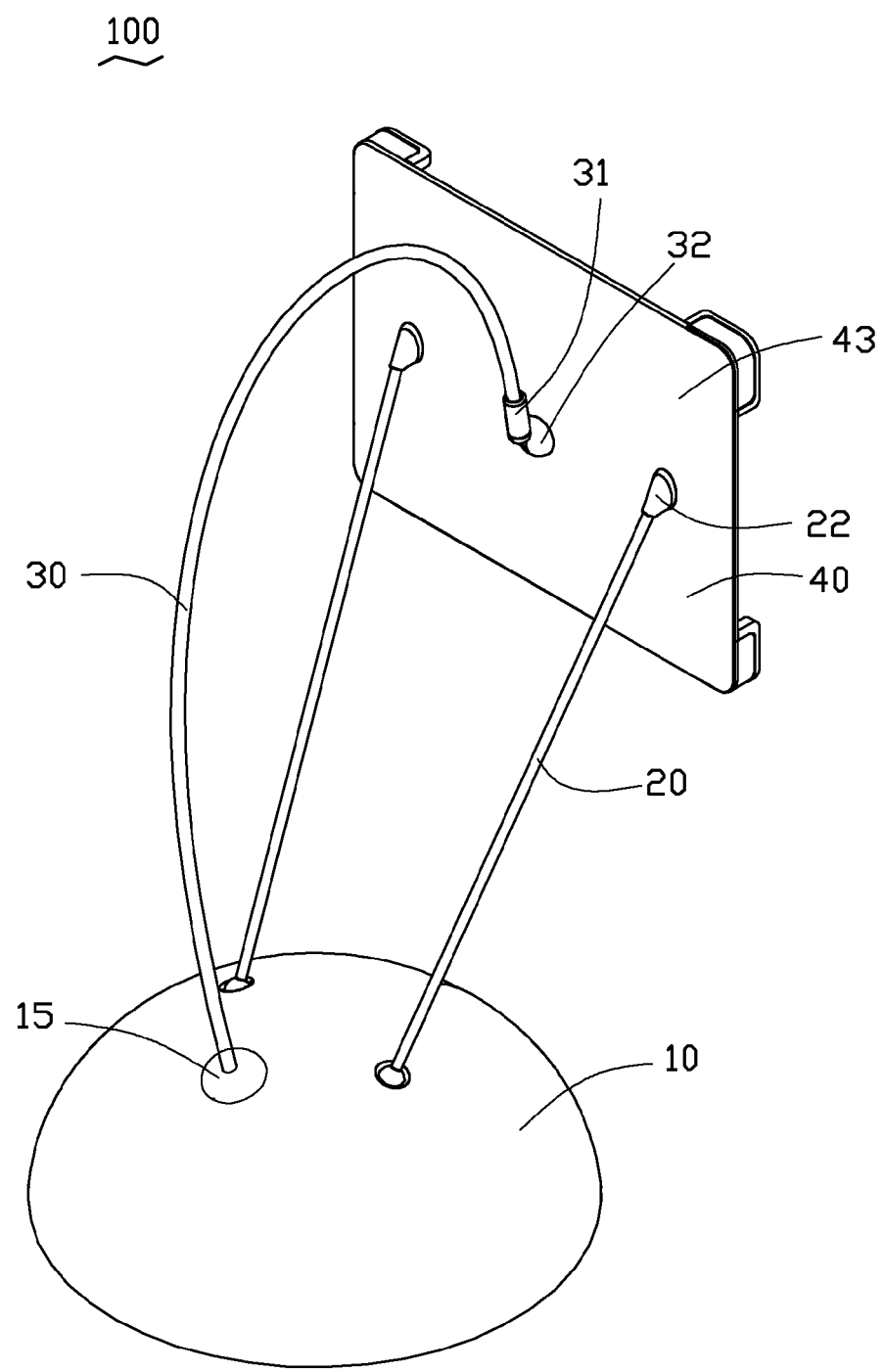
FIG. 3 is another assembled view of the support stand of FIG. 2, showing another aspect thereof.

Referring to FIG. 3, the positioning rod 30 is made of flexible material. The positioning rod 30 is flexible enough to be bent but stiff enough to maintain a position to which it is bent. The positioning rod 30 includes a connecting end 31, a retaining end 32 opposite to the connecting end 31, and a second magnet 33. The second magnet 33 is pivotably mounted (e.g., screwed) on the connecting end 31. The retaining end 32 is non-movably retained (e.g. friction fit) in the retaining hole 151 so the positioning rod 30 is retained on the base 10.

Figure 4:
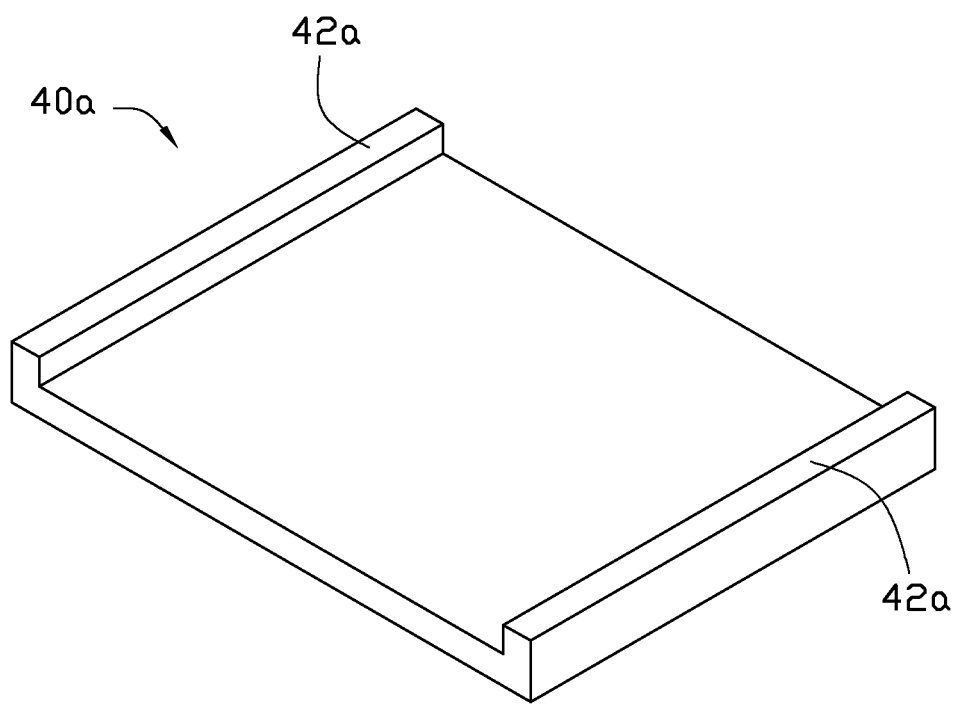
FIG. 4 is schematic view of a second exemplary of a support board.
Figure 5:
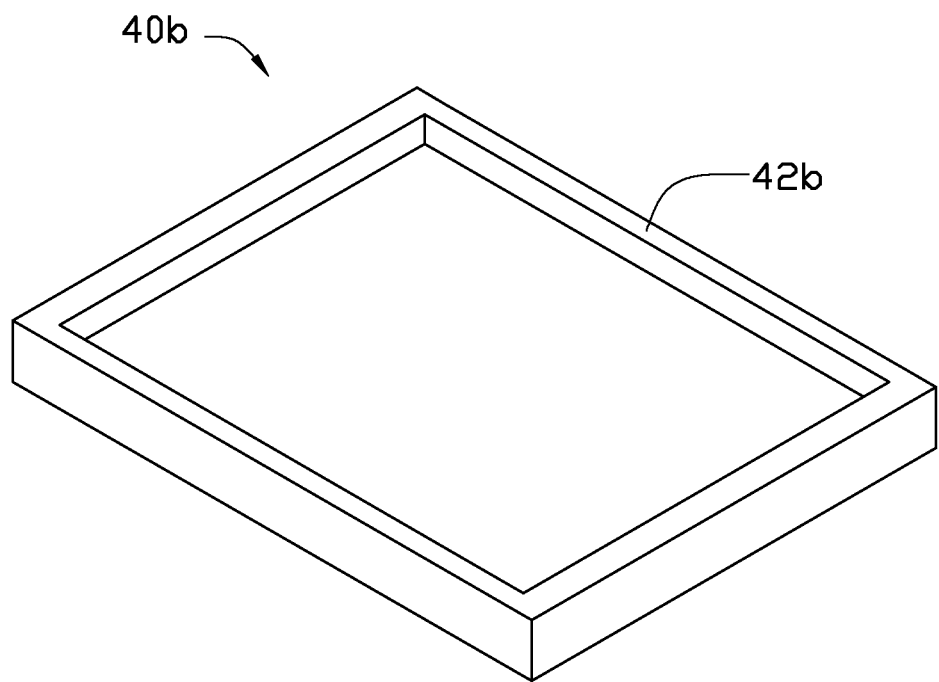
FIG. 5 is schematic view of a third exemplary of a support board.

The support board 40 includes a front surface 41, latching blocks 42 and a back surface 43. Each latching block 42 is substantially L-shaped when located at corners of the support board. However, two elongated latching blocks 42a may be used (FIG. 4) on a support board 40a, or latching blocks or a single latching rim 42b can completely or substantially surround a support board 40b (FIG. 5). The latching blocks 42 cooperatively enclose a latching space 44 for latching an electronic device 200. In this exemplary embodiment, each latching block 42 is located in one corner of the support board 40. Each latching block 42 includes a protective pad 421 located on an inner side thereof. The pads 421 protect the electronic device 200 latched between the latching blocks 42 from damage. The back surface 43 includes two third magnets 431 and a fourth magnet 432. The third magnets 431 attach the first magnets 22 thereby retaining the support board 40 on the support rods 20. The fourth magnet 432 attaches the second magnet 33 thereby retaining the support board 40 on the positioning rod 30.

In assembly, each ball joint 21 is mounted in one of the spherical holes 12 to rotatably mount the support rods 20 on the base 10. The retaining pins 152 are retained in the retaining troughs 153 so the mounting board 15 is retained on the base 10. The retaining end 32 of the positioning rod 30 is retained in the retaining hole 151 so the positioning rod 30 is mounted on the base 10. The first magnets 22 attract the third magnets 431 thereby retaining the support board 40 on the support rods 20. Because the ball joints 21 can rotate in the spherical holes 12 in any direction, and the support rods 20 are mounted to the base 10 by the engagement of the ball joints 21 in the spherical holes 12, the support rods 20 can rotate relative to the base 10 in any direction to adjust angles between each support rod 20 and the base 10. After the angles between each support rod and the base 10 are adjusted, the positioning rod 30 is bent until the second magnet 33 is attached to the fourth magnet 432. Thus, the support board 40 is steadily positioned above the base 10 by the support rods 20 and the positioning rod 30, and is ready to support and position the electronic device for more comfortable use.

It is to be understood that the third magnets 431 and the fourth magnet 432 can be omitted when the support board 40 is made of iron or steel.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A support stand comprising:

a base;

two support rods rotatably mounted to the base;
a positioning rod retained on the base, the positioning rod being capable of remaining in a bent state after being bent; and
a support board removably positioned above the base by the support rods and the positioning rod;
wherein the base defines two spherical holes; each support rod includes a ball joint located at one end thereof and a first magnet located at another end thereof, each ball joint is located in one of the spherical holes to rotatably retain a corresponding support rod to the base; the first magnets attach the support board to the support rods.

2. The support stand of claim 1, wherein the base further includes a mounting board defining a retaining hole one side thereof; the positioning rod includes a retaining end non-movably retained in the retaining hole to retain the positioning rod on the base.

3. The support stand of claim 2, wherein the mounting board further includes a plurality of retaining pins protruding from another side thereof opposite to the retaining hole; the base defines an equal number of retaining troughs corresponding to the retaining pins; each retaining pin is retained in one of the retaining troughs to hold the mounting board to the base.

4. The support stand of claim 2, wherein the positioning rod further includes a connecting end opposite to the retaining end and a second magnet pivotably mounted on the connecting end, the second magnet attaches the support board to the positioning rod.

5. The support stand of claim 4, wherein the support board includes two third magnets attaching the first magnets to retain the support board on the support rods.

6. The support stand of claim 4, wherein the support board further includes a fourth magnet attaching the second magnet to retain the support board on the positioning rod.

7. The support stand of claim 1, wherein the support board includes a front surface and blocks located on the front surface.

8. The support stand of claim 7, wherein each latching block is located at a corner of the support board and is substantially L-shaped.

9. The support stand of claim 8, wherein the latching blocks cooperatively enclose a latching space therebetween.

10. The support stand of claim 9, wherein the latching blocks comprise a latching rim.

11. The support stand of claim 7, wherein each latching block includes a protective pad located on an inner side thereof.

12. A support stand comprising:
a base;
two support rods made of rigid material and being capable of rotating relative to the base in any direction, each support rod includes a first end and a second end opposite to the first end, the first end rotatably mounted to the base;
a positioning rod made of flexible material and being capable of being bent in any direction, one end of the positioning rod retained on the base; and
a support board;
wherein the second end is removably attached to the support board, and the other end of the positioning rod is removably attached to the support board, which cooperatively support the support board above the base; and
wherein each support rod further includes a first magnet located at the second end; the first magnets attach the support board to the support rods.

13. The support stand of claim 12, wherein the base defines two spherical holes;
each support rod includes a ball joint located at the first end, each ball joint is located in one of the spherical holes to rotatably retain a corresponding support rod to the base.

14. The support stand of claim 12, wherein the base further includes a mounting board defining a retaining hole one side thereof; the positioning rod includes a retaining end non-movably retained in the retaining hole to retain the positioning rod on the base.

15. The support stand of claim 14, wherein the mounting board further includes a plurality of retaining pins protruding from another side thereof opposite to the retaining hole; the base defines an equal number of retaining troughs corresponding to the retaining pins; each retaining pin is retained in one of the retaining troughs to hold the mounting board to the base.

* * * * *